April 23, 1968   A. G. MASSA   3,379,080
CUTTING DEVICE FOR PIPES AND THE LIKE
Filed Dec. 13, 1965   3 Sheets-Sheet 2

INVENTOR.
ANTHONY G. MASSA
BY
ATTORNEY

INVENTOR.
ANTHONY G. MASSA 3,379,080
CUTTING DEVICE FOR PIPES AND THE LIKE
Anthony G. Massa, 23 Preston St.,
Hartford, Conn. 06114
Filed Dec. 13, 1965, Ser. No. 513,325
8 Claims. (Cl. 82—61)

ABSTRACT OF THE DISCLOSURE

There is disclosed a power-operated cutting device for pipes and the like adapted to cut and sever pipes of various sizes and diameters utilizing clamping means and a cutting head which is rotatably mounted in the housing. A cutter and a plurality of centering members are adapted to be moved radially inwardly and outwardly of the pipe-receiving aperture, and camming means are engaged with the cutter and centering means for movement thereof relative to the cutting head while the cutting head is rotating. Manually operable means move such means simultaneously into cutting and clamping engagement with the pipe received in the device so that the operator is able to clamp and cut the pipe with one movement.

The present invention relates to cutting devices for pipes and the like and more particularly to a novel power-driven cutting device which is adapted to portable use.

The term "pipe" as used herein refers to various types of pipe or tubing employed by the plumbing, construction and electrical industry, solid rods of relatively thin section and other elongated members of comparable nature.

Portable power-driven pipe-cutting devices are well known in the prior art; however, these devices usually do not provide for manual operation of the cutting means but rather provide for automatic cutting of the pipe. In cutting relatively soft metal or thin tubing pipe, such automatic cutting of the pipe may prove unsatisfactory because of deformation of the pipe by the cutting means. Since clamping of the pipe is desirable during cutting, many prior art devices require a first operation by the operator for clamping the pipe in the device and thereafter a second operation for actually cutting the pipe.

It is an object of this invention to provide a novel power-driven pipe-cutting device having relatively simple but highly effective means for manually operating the pipe cutting means to minimize deformation of the pipe.

It is also an object to provide such a pipe-cutting device wherein the pipe is concurrently manually clamped into the device and engaged with the cutting means by a single action of the operator.

Another object is to provide such a pipe-cutting device that is relatively rugged, lightweight and relatively inexpensive to manufacture.

Other objects and advantages will be readily apparent from the following detailed specification and claims and the attached drawings wherein:

Figure 1:
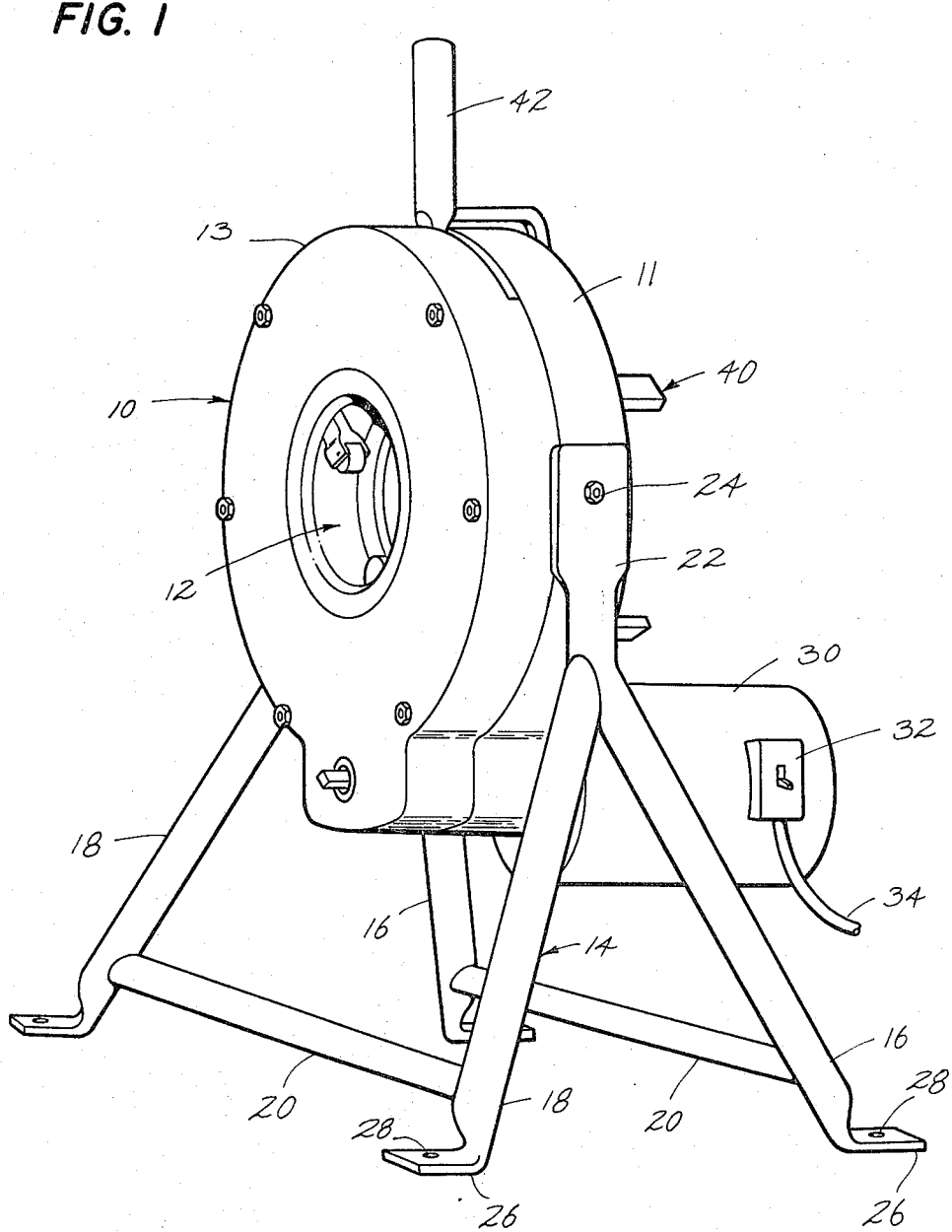
FIGURE 1 is a perspective view of a pipe-cutting device embodying this invention.

It has now been found that the foregoing objects and other advantages may be readily obtained in a power-operated pipe-cutting device adapted to cut and sever pipes of various sizes and diameters which has a housing with a pipe-receiving aperture therein and clamping means thereon for releasably clamping a pipe within the aperture. A cutting head is rotatably mounted in the housing and cutting means is movably mounted on the cutting head for radial movement inwardly and outwardly of the housing aperture to sever pipes clamped therein. Power operating means is provided for rotating the cutting head and manually operable camming means is provided which engage the cutting means for movement thereof relative to the cutting head and into cutting engagement with a pipe clamp in the housing aperture while the head is rotating.

In the preferred aspect of the present invention, a handle on the pipe-cutting device operates both the clamping mechanism and the pipe-cutting mechanism simultaneously. In one form, the handle is engaged with the clamping mechanism by two tension springs so that, after the clamps or dogs have engaged the pipe, the handle is still rotatable to move the cutting mechanism into engagement and to cut the pipe. The handle is also engaged with a gear train which is adapted to operate a camming mechanism to move the cutting member and positioning members of the pipe-cutting mechanism into engagement with the pipe while the cutting mechanism is being driven by the attached electric motor. Thus, by providing the gear train, it is possible to manually move the cutter and supporting members into engagement with the pipe while the cutting mechanism is being rotated by the electric motor enabling an operator to apply more or less manual pressure as desired to the pipe being cut. In this manner, pipes of soft material such as copper and bronze and pipes of thin gauge metal wall may be cut without bending the pipe.

The gear train is provided with a ring gear rigidly attached to the handle and in turn is engaged with a pinion gear rotatable on a shaft mounted on the cutting head which is also engaged with an intermediate ring gear which is mounted for free rotation within the housing. The intermediate ring gear is also engaged with another pinion gear which is rotatable on a shaft on the camming mechanism and is engaged with another ring gear fixed to the housing. Rotation of the handle causes rotation of the pinion gear on the shaft attached to the camming mechanism which moves on the fixed ring gear attached to the housing causing the camming means to move relative to the cutting head. However, rotation of the pinion gear attached to the shaft on the cutting head does not cause movement of the cutting head as the gears engaged therewith are rotatable.

To effect rotation of the cutting head, an electric motor is provided which has a pinion gear mounted on the shaft thereof which is engaged with a bull gear attached to the cutting head. The cutting means desirably comprises at least one cutter and a plurality of centering members which are spaced about the periphery of the aperture or bore in the housing member so as to adequately center a pipe during the cutting operation. To effect simultaneous operation of the cutting means and clamping means, the handle has a first portion which operates the cutting means and a second portion which operates the clamping means. Thus, as the handle is turned by the operator, movement of the elements of both is simultaneously effected and means are provides for permitting further movement of the handle and cutting means after engagement of the clamping means with the pipe, conveniently by a spring connection between the handle portion and clamping means.

Referring now in detail to the attached drawings, a portable electrical pipe-cutting device is shown in FIGURE 1 having a housing generally designated by the numeral 10 with a centrally located aperture or bore generally designated by the numeral 12. The housing 10 has a front casing 11 and a rear casing 13 and is supported on a stand or frame generally designated by the numeral 14 which has a pair of front legs 16 and a pair of rear legs 18 with each pair having a brace 20 extending therebetween to give added rigidity to the stand 14. The front legs 16 have flange portions 22 at their upper ends adjacent opposite sides of the housing 10 upon which the housing 10 is mounted by fasteners 24 attached to the front casing 11 and may provide a pivot therefor to receive pipes at an angle to the base surface for the devices, thus enabling the ground to act as a support for one end of the pipe. The rear legs 18 may be welded or otherwise suitably connected to the legs 16 to form generally Y-shaped supporting members on either side of the housing 10. The lower portions of each of the pairs of legs 16 and 18 have horizontally extending flange portions 26 providing a more stable support surface and which have apertures 28 for mounting if desired, on any suitable surface or movable support such as a skid. An electric motor 30 is mounted on the housing 10 by fastening means (not shown) and has a switch 32 for electrical power supplied thereto by cable 34.

Figure 2:
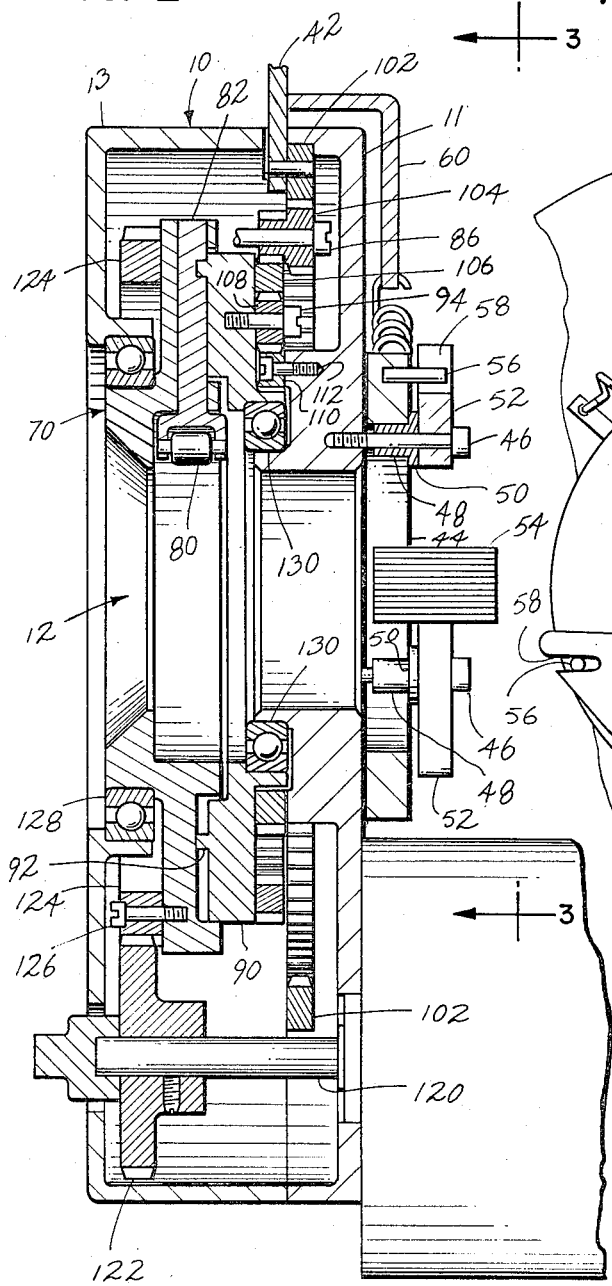
FIGURE 2 is a fragmentary cross-sectional view along the longitudinal axis to an enlarged scale of the operating mechanism of the pipe-cutting device of FIGURE 1.
Figure 3:
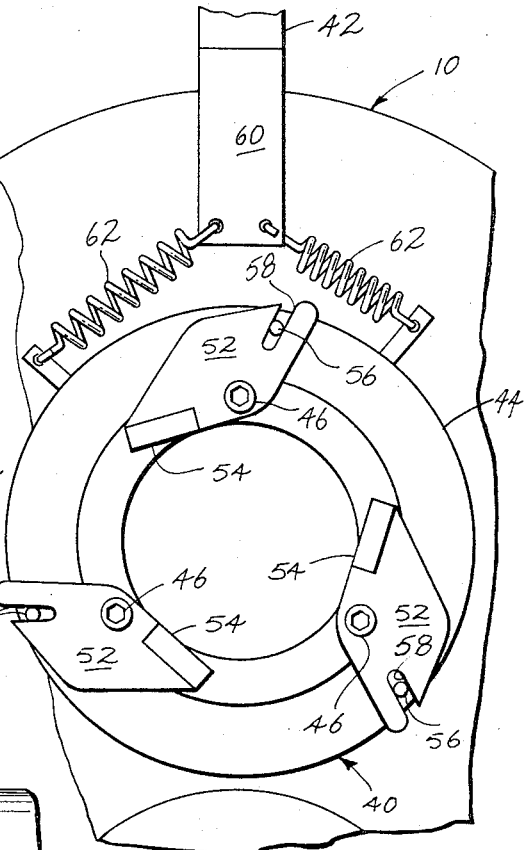
FIGURE 3 is a fragmentary elevational view of the operating mechanism along the line 3—3 of FIGURE 2 illustrating the clamping mechanism.

In order to secure pipes of various diameters centrally in bore 12 of the housing 10 and to prevent a pipe secured therein from being rotated when it being cut by the pipe-cutting device, a clamping mechanism generally designated by the numeral 40 is provided to one side of the housing 10 adjacent the bore 12. A handle 42 is rotatably mounted on the housing 10 and operates the clamping mechanism 40 simultaneously with the cutting mechanism which will be described in detail hereinafter. As best seen in FIGURES 2 and 3, the clamping mechanism 40 has an annular ring 44 which is rotatably mounted on the housing 10 by means of rollers or bearing members 48 which engage the inner periphery of the annular ring 44 and which are mounted on shafts 46 extending normally to the front casing 11.

Figure 4:
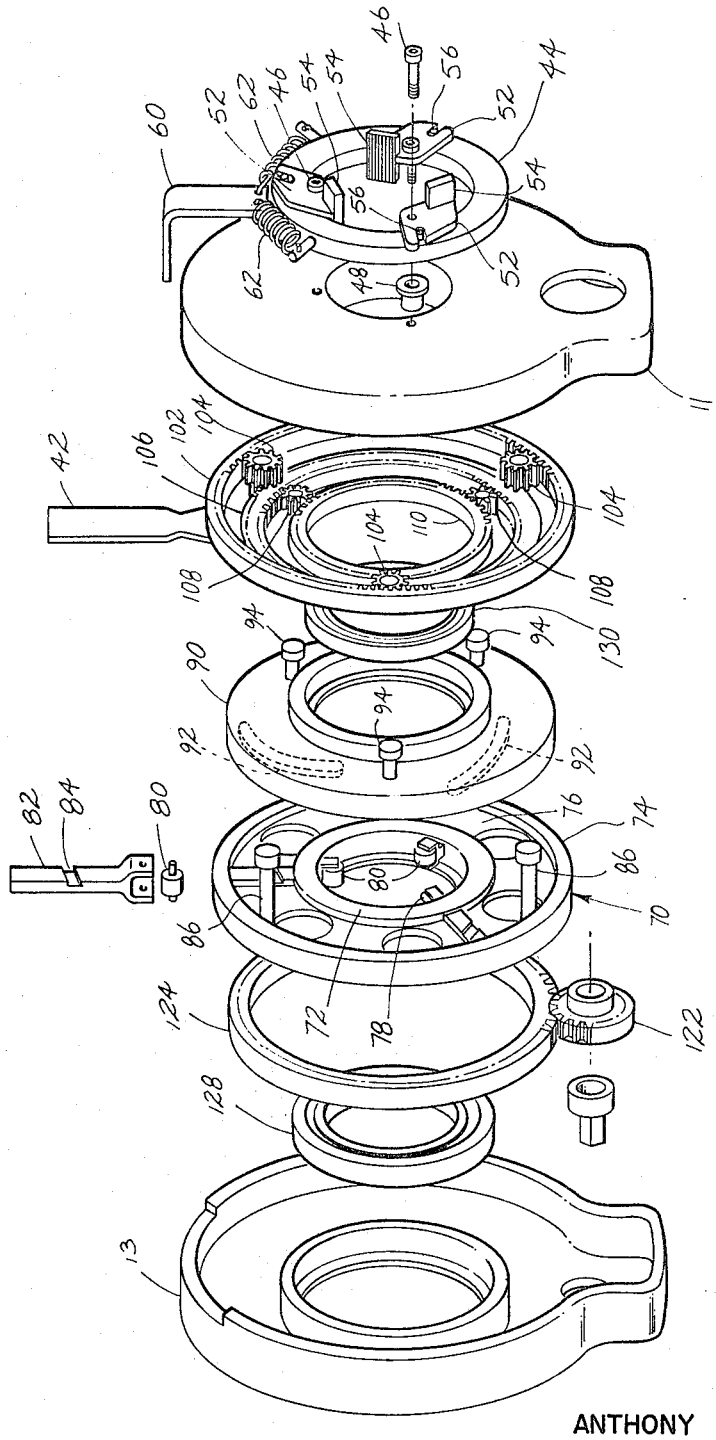
FIGURE 4 is an exploded perspective view to a reduced scale of the operating mechanism of FIGURES 2-3.

As seen in FIGURES 2 and 4, the rollers 48 have a collar portion 50 which retains the annular ring 44 between the collar portion 50 and the front casing 11 of the housing 10. Rotatably mounted on the outer ends of the shafts 46 are clamping members 52 which have at one end thereof a pipe-engaging portion 54 in the form of a generally rectangularly shaped plate having a toothed or serrated surface facing the bore 12 for engaging the periphery of a pipe placed centrally therein to support the pipe and to lock the pipe against any tendency of the cutting mechanism to rotate the pipe. Mounted on and extending normally from near the outer periphery of the annular ring 44 are a plurality of pins or dowels 56 which are disposed in elongated slots or apertures forming a camming surface 58 for moving the clamping members 52 into engagement with the pipe upon rotation of the annular ring 44.

The handle 42 has an L-shaped extension portion 60 which is engaged with the clamping mechanism 40 by means of two tension springs 62 which are connected at one end to the L-shaped extension 60 and at the other end thereof to lugs 64 extending radially outwardly from the annular ring 44. Thus, when the handle 42 is rotated, the annular ring 34 is rotated on the rollers 48 by means of the tension springs 62. As the annular ring 44 rotates, the pins 56 are engaged with the camming surface 58 to rotate the clamping members 52 about the shafts 46 into or out of engagement with the pipe. When the clamping members 52 have engaged the pipe, it is possible for the handle 42 to continue to rotate due to the resiliency of tension springs 52 in order to operate the cutting means as will be described hereinafter.

As best seen in FIGURES 2 and 4, the pipe-cutting mechanism of this device is contained within the housing 10 about the cylindrical aperture or bore 12 and a cutting head generally designated by the numeral 70 which is rotatably mounted within the housing 10. The cutting head 70 comprises a wheel formed by the inner hub 72 and the outer hub 74 which are joined by an interconnecting web portion 76. Slidably supported on the cutting head 70 for radial movement thereon is a cutting tool 78 and two pipe centering members 80. Both the cutting tool 78 and the pipe centering members 80 are rotatably carried on a bifurcated plunger element 82 with a camming slot 84 for engagement with a cam hub 90 in a manner to be described hereinafter.

The plunger elements 82 of the cutting tool 78 and pipe centering members 80 are slidably supported within slots (not shown) in the inner hub 72 and the outer hub 74 for radial movement into engagement and away from a pipe positioned in the bore 12. Extending normally from the side surface of the cutting head 70 adjacent the cam hub 90 are shafts 86 upon which are mounted pinion gears 104 for a purpose to be described hereinafter.

The cam hub 90 is generally dis-shaped and is rotatably mounted in housing 10. On the surface adjacent the cutting head 70, the cam hub 90 has a plurality of cam projections or bosses 92 which seat within the camming slots 84 of the cutting tool 78 and the pipe centering members 80. The cam hub 90 is rotatable relative to the cutting head 70 for the length of the cam projections 92 and movement of the cam hub 90 relative to the cutting head 70 causes the cam projections 92 to slide in camming slots 84 to move the plunger elements 82 radially relative to the cutting head 70. Extending normally to the cam hub 90 are shafts 94 upon which are mounted pinion gears 108 as will be described hereinafter.

As mentioned above, the handle 42 simultaneously operates the clamping mechanism 40 and the pipe cutting mechanism by its rigid connection to an annular outer ring gear 102 having gear teeth around the periphery of its inner circumferential surface. The ring gear 102 is rotatably geared with the plurality of pinion gears 104 which are supported within the housing 10 on shafts 86 on the cutting head 70. Each pinion gear 104 has a gear portion 104a at one end thereof engaged with the ring gear 102 and another gear portion 104b of lesser diameter engaged with an intermediate floating ring gear 106 having gear portions on both its outer and inner circumferential surfaces. The gear portion on the inner circumferential surface of the floating ring gear 106 is geared with the plurality of cam operating pinion gears 108 which are supported on shafts 94 mounted on the cam hub 90. The plurality of cam operating gears 108 are also geared with an inner annular ring gear 110 which has gear teeth on its outer circumferential surface for engagement with the cam operating gears 108 and is rigidly secured to the housing 10 by suitable means such as fasteners 112 secured to the front casing 11.

Accordingly, movement of the handle 42 causes rotation of the outer ring gear 102 which in turn causes rotation of the pinion gears 104 which in turn rotate the ring gears 106. This rotation in turn causes the cam operating pinion gears 108 to rotate and move on the stationary inner ring gear 110 and to move the cam hub 90 relative to the cutting head 70, thus causing the cam projections 92 to be moved within the camming slots 84. In this manner, the cutting tool 78 and pipe centering members 80 are moved into and out of engagement with a pipe retained in the bore 12 of the housing 10. The cam hub 90 is moved relative to the cutting head 70 since rotation of the pinion gears 108 by the ring gear 106 causes the pinion gear 110 to "walk" about the stationary ring gear 110 which is fixed to the housing 10. Rotation of the pinion gear 104 by the ring gear 102 does not cause the shaft 86 to move the cutting head 70 since the ring gear 106 is free to rotate and does so when engaged by the pinion gears 104.

The electric motor 30 drives the cutting mechanism by means of a drive shaft 120 which is connected to a pinion gear 122 geared with an annular bull gear 124 which is secured to the cutting head 70 by suitable means such as fasteners 126. The cutting head 70 and the cam hub 90 are rotatably mounted within the housing 10 by means of the bearing ring 128 supporting the cutting head 70 on the rear casing 13 and the bearing ring 130 supporting the cam hub 90 on the front casing 11. Thus, operation of the electric motor 30 to rotate the shaft 120 causes rotation of the bull gear 124 and the cutting head 70 which, in turn, rotates the cam hub 90 by the engagement of the camming slots 84 on the cutting tool 78 and the pipe centering members 80 with the cam projections 92 on the cam hub 90. Accordingly, rotation of the drive shaft 120 by the electric motor 20 causes rotation both of the cutting head 70 and the cam hub 90 within the housing 10 on the bearing rings 128 and 130.

Rotation of the cutting head 70 and cam hub 90 causes the shafts 86 and 94 to rotate the pinion gears 104 and 108 which are free to rotate while engaged with the ring gears 102, 106 and 110. When there is no manual movement of the handle 42, the rotatable ring gears 102 and 106 will be stationary; however, when the handle 42 is rotated manually the ring gears 102 and 106 will rotate in the manner described above to cause relative movement between the cutting head 70 and the cam hub 90.

Thus, by providing a power-driven pipe-cutting device having means for manually operating the pipe cutting mechanism while the cutting head is being rotated, pipes clamped in the aperture of the housing may be cut by manually applying pressure to the housing may be cut by manually applying pressure to the cutting means without bending the pipe. The handle is adapted to simultaneously operate the pipe cutting means and the clamping means so that both of these operations are rapidly accomplished concurrently by a single movement of the operator. In addition, the pipe cutting device provides a mechanism which is lightweight, relatively inexpensive to manufacture, and relatively rugged in construction.

Having thus described the invention, I claim:

1. A power-operated cutting device for pipes and the like adapted to cut and sever pipes of various sizes and diameters, comprising: a housing having a pipe-receiving aperture therein; clamping means on said housing for releasably clamping a pipe within said aperture of said housing; a cutting head rotatably mounted in said housing; cutting means movably mounted on said cutting head for movement radially inwardly and outwardly of said housing aperture to sever pipes clamped therein including a cutter and a plurality of centering members; power-operating means for rotating said cutting head; camming means engaging said cutter and centering members for movement thereof relative to said cutting head and into cutting engagement with a pipe clamped in said housing aperture while said cutting head is rotating; and manually operable means connected to said clamping means and said camming means for simultaneous movement thereof into clamping and cutting engagement with a pipe received in said housing aperture.

2. The cutting device of claim 1 wherein said power-operating means for rotating said cutting head is an electric motor having a shaft with a pinion gear thereon engaged with a bull gear attached to said cutting head.

3. The cutting device of claim 1 wherein said camming means comprises: a cam member rotatably mounted in said housing having a camming surface thereon engaged with said cutting means; intermediate gear means rotatably mounted in said housing; first gear means rotatably mounted in said housing to one side of said intermediate gear means; second gear means rigidly fixed on said housing to the other side of said intermediate gear means; third gear means rotatably mounted on said cutting head and engaged with said first gear means and said intermediate gear means; fourth gears means rotatably mounted on said cam member and engaged with said second gear means and said intermediate gear means; and wherein said manually operable means is an operating handle mounted on said first gear means and extending outwardly of said housing for manually moving said first gear means.

4. The cutting device of claim 1 wherein said camming means comprises: a cam hub rotatably mounted in said housing having a camming surface thereon engaged with said cutting means; an intermediate ring gear rotatably mounted in said housing; a first ring gear rotatably mounted in said housing to one side of said intermediate ring gear and radially spaced apart therefrom; a second ring gear rigidly mounted in said huosing to the other side of said intermeiate ring gear and radially spaced apart therefrom; a first pinion gear rotatably mounted on said cutting head and engage with said first ring gear and said intermediate ring gear; a second pinion gear rotatably mounted on said cam hub and engaged with said second ring gear and said intermediate ring gear; and wherein said manually operable means is an operating handle mounted on said first ring gear and extending outwardly of said housing for manually moving said first ring gear.

5. The power-operated pipe-cutting device of claim 4 wherein said operating handle is connected to said clamping means for simultaneous manual movement of said clamping means and said cutting means into clamping and cutting engagement with a pipe received in said housing aperture.

6. A power-operated cutting device for pipes and the like adapted to cut and sever pipes of various sizes and diameters, comprising; a housing having a pipe-receiving aperture therein; clamping means on said housing for releasably clamping a pipe within said aperture of said housing; a cutting hear rotatably mounted in said housing; cutting means movably mounted on said cutting head for movement radially inwardly and outwardly of said housing aperture to sever pipes clamped therein; electrical power operating means rotating said cutting head; a cam member rotatably mounted in said housing having a camming surface thereon engaged with said cutting means for movement thereof relative to said cutting head and into cutting engagement with a pipe clamped in said housing aperture while said cutting head is being rotated by said power operating means; intermediate gear means rotatably mounted in said housing; first gear means rotatably mounted in said housing to one side of said intermediate gear means; second gear means rigidly fixed in said housing to the other side of said intermediate gear means; third gear means rotatably mounted on said cutting head and engaged with said first means and said intermediate gear means; fourth gear means rotatably mounted on said cam member and engaged with said second gear means and said intermediate gear means; and an operating handle mounted on said first gear means and extending outwardly of said housing for manually moving said first gear means to move said cutting means into cutting engagement with a pipe received in said aperture, said handle being connected to said clamping means to move said clamping means simultaneously into clamping engagement with the pipe.

7. The pipe-cutting device of claim 6 wherein said cam member is a hub and wherein said first, second and intermediate gear means are ring gears and said third and fourth gear means are pinion gears, said first and second gear means being radially spaced apart from said intermediate gear means.

8. The cutting device of claim 3 wherein said cutter and centering members have a cam following surface engaged with said camming surface of said cam member for movement of said cutter and centering members relative to said cutting head.

References Cited

UNITED STATES PATENTS

| | | | |
|---|---|---|---|
| 1,749,861 | 3/1930 | Vosper | 82—4 X |
| 2,057,011 | 10/1936 | Corwin | 82—61 |
| 2,586,209 | 2/1952 | Covetti | 82—72 |
| 2,679,686 | 6/1954 | Ingwer | 82—47 X |
| 2,747,274 | 5/1956 | Willard | 82—4 X |

FOREIGN PATENTS 572,217  9/1945  Britain.

HARRISON L. HINSON, *Primary Examiner.*